United States Patent [19]

Berberich

[11] Patent Number: 5,672,092
[45] Date of Patent: Sep. 30, 1997

[54] GRINDING MACHINE

[75] Inventor: Paul Berberich, Frankfurt am Main, Germany

[73] Assignee: NAXOS-UNION Schleifmittel- und Schleifmaschinenfabrik AG, Langen, Germany

[21] Appl. No.: 702,930

[22] Filed: Aug. 26, 1996

[30] Foreign Application Priority Data

Aug. 26, 1995 [DE] Germany .................. 195 31 506.5

[51] Int. Cl.$^6$ .................................................. B24B 49/00
[52] U.S. Cl. ............................... 451/10; 451/9; 451/11; 451/142; 451/242
[58] Field of Search ........................ 451/9, 10, 11, 451/51, 242, 246, 142

[56] References Cited

U.S. PATENT DOCUMENTS

| | | | |
|---|---|---|---|
| 4,144,677 | 3/1979 | Nilsson | 451/294 |
| 4,180,946 | 1/1980 | Heijkenskjold et al. | 451/24 |
| 4,238,205 | 12/1980 | Geiger et al. | 451/142 |
| 5,024,025 | 6/1991 | Kihara et al. | 451/11 |
| 5,027,280 | 6/1991 | Ando et al. | 451/9 |
| 5,027,562 | 7/1991 | Kobayashi et al. | 451/11 |
| 5,133,158 | 7/1992 | Kihara et al. | 451/11 |
| 5,205,078 | 4/1993 | Takara et al. | 451/11 |
| 5,562,528 | 10/1996 | Ueyama et al. | 451/11 |
| 5,573,443 | 11/1996 | Yasuda et al. | 451/11 |

FOREIGN PATENT DOCUMENTS 38 21 412 A1  5/1989  Germany .
35 24 438 C2  1/1994  Germany .

*Primary Examiner*—Eileen P. Morgan
*Attorney, Agent, or Firm*—Chilton, Alix & Van Kirk

[57] ABSTRACT

A grinding machine comprises a grinding shaft which is rotatably mounted on the grinding shaft stock for rotation about a longitudinally extending shaft axis. The grinding machine includes at least one grinding disk fixedly mounted to the shaft and at least one bearing movably disposed between the grinding shaft and the grinding shaft stock for rotatably supporting the grinding shaft. Finally, the grinding machine includes an adjustment means with an adjustable piezoelectric actuator which is disposed between the bearing and the grinding shaft stock. The grinding machine can be used to grind selective regions of a workpiece which is mounted to a workpiece stock so as to define a fixed longitudinally extending workpiece axis. When a changing electrical potential is applied to the adjustment means, a piezoelectric element of the piezoelectric actuator experiences physical deformation thereby allowing the piezoelectric actuator to reposition the bearing until the grinding shaft axis is parallel to the workpiece axis.

20 Claims, 2 Drawing Sheets

GRINDING MACHINE

BACKGROUND OF THE INVENTION

1. Field of the Invention

The present invention generally relates to the field of grinding machines of the type having a grinding shaft which is rotatably mounted on a grinding shaft stock. More specifically, the invention is directed to a grinding machine for grinding selected portions of a workpiece, which has an adjustably oriented grinding shaft rotatably mounted on a grinding shaft stock so that the grinding shaft may be adjustably oriented relative to the workpiece. Accordingly, the general objects of the present invention are to provide novel and improved methods and apparatus of such character.

2. Description of the Related Art

Grinding machines have obviously enjoyed widespread utilization in a variety of industrial machining applications. Grinding machines are, for example, commonly employed to produce additional structural details on previously cast metal components. In one specialized application of this sort, a grinding machine can be used to grind selected regions of a somewhat elongated workpiece which is rotatably mounted on a workpiece stock for rotation about a workpiece axis. In such an application, the grinding machine includes a grinding shaft stock, having a grinding shaft rotatably mounted thereon, and at least one grinding disk fixedly mounted to the grinding shaft. As either, or both of, the grinding shaft or the workpiece are rotated about its axis and the grinding disk is brought into contact with the workpiece, the desired structure can be ground into the workpiece to produce the finished product. This process is commonly utilized, for example, to grind bearing seats into crankshafts and other components of internal combustion engines. Where several bearing seats need to be ground into a single workpiece, the grinding process can be accelerated if a plurality of grinding disks are disposed on a single grinding shaft. Thus, when the grinding disks are rotated and brought into contact with the workpiece, multiple bearing seats can be simultaneously ground into the workpiece.

One long standing problem associated with such applications of grinding machines arises from the need to accurately orient the grinding shaft with respect to the workpiece. It is often desirable to orient the grinding shaft axis parallel to the workpiece axis to ensure that uniform structures are ground into the workpiece. Thus, misalignment between the grinding shaft and the workpiece will result in manufacturing defects such as a generally conically-shaped structure, or a plurality of non-uniform structures, having been cut into the workpiece. The problem of non-uniform grinding results has become particularly acute in recent years due to the low manufacturing tolerances now commonly utilized in the production of components for modern machinery.

While attempts have been made to ensure proper alignment between a grinding shaft of such a grinding machine and a workpiece to be ground, these efforts have, to date, yielded unsatisfactory results. One such effort involves the use of an adjustment means incorporated into the grinding machine. This adjustment means is intended to allow fine tuning of the relative orientation between the grinding shaft and the workpiece. In this case, the adjustment means utilizes either hydraulics, mechanics, or pneumatics to physically adjust the position of the grinding shaft.

While the basic concept of employing an adjustment means in this manner has merit, in practice it has, suffered from a number of deficiencies including overall poor performance. This poor performance arises from a combination of factors such as the fact that the grinding shaft must be capable of precise positional adjustments which are made over extremely small distances (e.g., on the order of tens of $\mu m$). Another factor leading to poor performance is the fact that the adjustment means must overcome very high applied forces when repositioning the grinding shaft. In particular, adjustment means utilizing hydraulics acutely suffer from the deficiency of poor adjustability due to sticking between the components of the hydraulic cylinder.

Therefore, there remains a need in the art for an improved grinding machine having an adjustably oriented grinding shaft which overcomes the aforementioned deficiencies and disadvantages of the prior art and can, thereby, more accurately grind selected portions of a workpiece.

SUMMARY OF THE INVENTION

It is, accordingly, an object of the present invention to provide an improved grinding machine of the type having an adjustably oriented grinding shaft and at least one grinding disk fixedly mounted to the grinding shaft, the grinding machine being capable of more precisely and more reliably compensating for misalignment between the grinding shaft and a workpiece to thereby more accurately grind selected portions of the workpiece.

These and other objects and advantages of the present invention are provided in one embodiment by providing a grinding machine having a grinding shaft which is rotatably mounted on a grinding shaft stock for rotation about a longitudinally extending shaft axis. The grinding machine also includes at least one grinding disk fixedly mounted to the grinding shaft and at least one bearing movably disposed between the grinding shaft and the grinding shaft stock for rotatably supporting the grinding shaft. Finally, the grinding machine includes an adjustment means with a piezoelectric actuator which is capable of reorienting the bearing, and hence, the grinding shaft. The present invention can be used to grind selected regions of a workpiece which is mounted to a workpiece stock to define a fixed longitudinally extending workpiece axis. When a changing electrical potential is applied to the adjustment means, a piezoelectric element of the piezoelectric actuator experiences physical deformation thereby allowing the piezoelectric actuator to reposition the bearing until the grinding shaft axis is parallel to the workpiece axis. The desired structures can, thus, be accurately ground into the workpiece Optionally, the adjustment means of the present invention can also be provided with a bearing support means comprising some combination of springs and/or fixed bearing support members. The support means is disposed between the bearing and the grinding shaft stock to allow controlled movement of grinding shaft under the influence of the piezoelectric actuator.

As an additional option, the support means can be designed to cooperate with the piezoelectric actuator to pre-bias the bearing, and hence the grinding shaft, to an initial position due to the application of a pre-biasing electric potential to the adjustment means. Further increases and/or decreases of the electrical potential will cause either forward and backward movement of the piezoelectric actuator which will, in turn, impart movement to the grinding shaft and bearing. Once the appropriate position has been achieved, the grinding shaft will remain securely fixed in the desired location by holding the electrical potential constant.

In still another optional embodiment of the invention, the grinding shaft can be rotatably supported at multiple points along the length thereof by multiple bearings. In such an embodiment, the adjustment means can include a plurality of piezoelectric actuators which act upon the various bearings, either independently or in cooperation with one another, to position the grinding shaft relative to the workpiece.

Still other optional embodiments include a measuring system which monitors the physical dimensions of the workpiece to be ground and produces measurement signals related to such dimensions. These measurement signals can be fed into a control system which produces electrical potentials which are related to the measurement signals. These electrical potentials are then applied to the piezoelectric actuator of the adjustment means as described above. Thus, appropriate orientation of the grinding shaft with respect to the workpiece can be automatically achieved during grinding operations.

Numerous other advantages and features of the present invention will become apparent to those of ordinary skill in the art from the following detailed description of the invention, from the claims and from the accompanying drawings.

BRIEF DESCRIPTION OF THE DRAWINGS

The preferred embodiment of the present invention will be described below with reference to the accompanying Figures wherein like numerals represent like structures and wherein.

DESCRIPTION OF THE PREFERRED EMBODIMENT

The preferred embodiment of a grinding machine in accordance with the present invention will now be described with joint reference to FIGS. 1 and 2. As shown therein, grinding machine 1 includes a grinding shaft stock 2 which is capable of linearly moving in either direction along an axis X. A grinding shaft 3 is mounted to grinding shaft stock 2 so that it can be rotated about a longitudinal shaft axis which is oriented generally perpendicularly to axis X. At least one grinding disk 4 is fixedly mounted to grinding shaft 3 for rotation about the shaft axis along with shaft 3. However, it is contemplated that grinding disk 4 can be replaced by a plurality of grinding disks which are coaxially disposed on grinding shaft 3 wherein each of the disks are in longitudinal spaced relationship to one another along the length of grinding shaft 3. One advantage of this alternative embodiment is that, with such an arrangement, grinding machine 1 can be used to simultaneously form a plurality of structures on a single workpiece.

Figure 1:
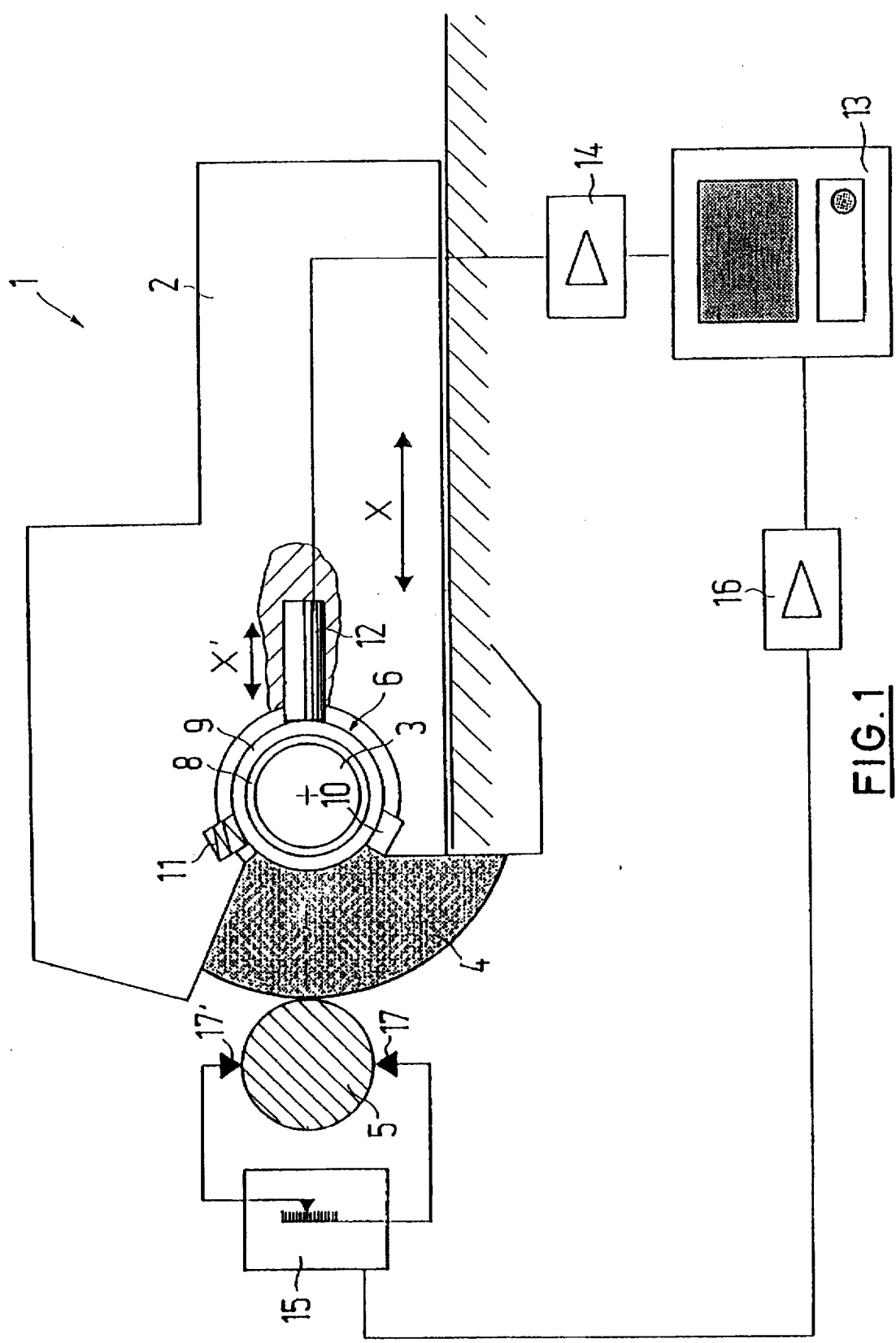
FIG. 1 is a schematic representation of a grinding machine in accordance with the preferred embodiment of the present invention, the grinding machine being shown in combination with a workpiece.

Grinding machine 1 preferably operates on a workpiece 5 which is rotatably mounted to a workpiece shaft stock (not shown in FIG. 1). As illustrated in FIG. 2, workpiece 5 is preferably rotatably mounted to the workpiece shaft stock at two points located at opposite ends thereof such that workpiece 5 defines a fixed longitudinal axis. This workpiece axis is at least generally coplanar with the above-described grinding shaft axis. The ordinary artisan will readily appreciate that workpiece 5 could, alternatively, be immovably fixed to a workpiece shaft stock or may even be mounted for movement in one or more other directions relative to grinding disk 4.

When structures are to be ground into workpiece 5, grinding shaft 3 is rotated about the shaft axis and grinding shaft stock 2 is moved along axis X in the direction of workpiece 5 until contact therebetween occurs. As shown in FIG. 2, however, if grinding shaft 3 is not oriented parallel to workpiece 5, an oblique angle $\alpha$ will be defined between the surface of grinding disk 4 and the surface of workpiece 5. Similarly, the shaft axis and the workpiece axis will cooperate to define an angle of equal magnitude as angle $\alpha$. If workpiece 5 is ground under such conditions, a generally conically shaped workpiece will result. Since such conicity of the resulting workpiece is typically undesirable, it is important to adjust the grinding shaft/workpiece alignment to eliminate such conicity. In order to eliminate grinding shaft/workpiece misalignment, the present invention contemplates the provision of adjustment means to compensate for the misaligned condition shown in FIG. 2. Restated, the adjustment means of the present invention reduces oblique angle $\alpha$ to 0° by adjusting the angular orientation of grinding shaft 3 with respect to workpiece 5. Naturally, when angle $\alpha$ is reduced to 0°, the shaft axis will be parallel to the workpiece axis.

In order to adjust the angular orientation of grinding shaft 3 with respect to workpiece 5, grinding machine 1 is preferably provided with first and second bearings 6 and 7 which are movably disposed on grinding shaft stock 2 and rotatably support grinding shaft 3. Each of bearings 6 and 7 preferably includes an inner bearing ring 8 which contacts grinding shaft 3 and an outer bearing ring 9 which is disposed about the outer surface of inner bearing ring 8. The provision of outer bearing ring 9, as shown, allows inner bearing ring 8 to take the form of a conventional grinding shaft bearing and, therefore, the invention can be easily and inexpensively incorporated into conventional grinding shaft stocks. However, those of ordinary skill will appreciate that the present invention is also compatible with many of the other widely known and used shaft mounting devices such as guide and/or roller bearings.

Figure 2:
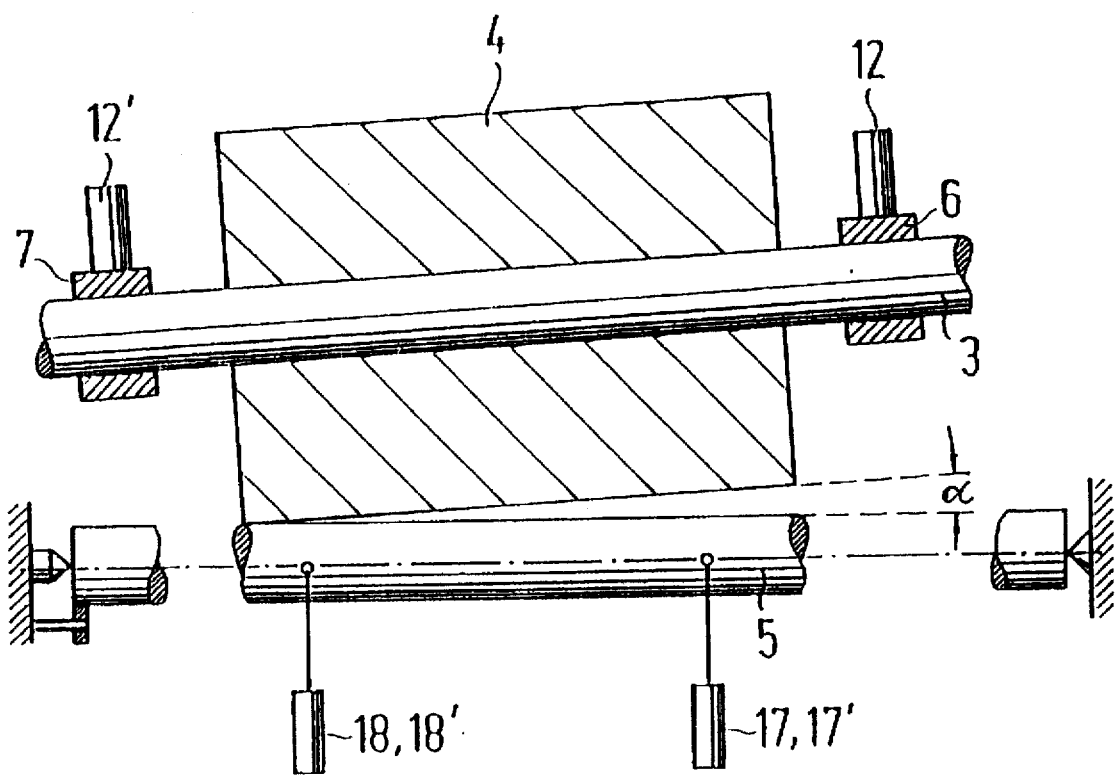
FIG. 2 is a schematic representation of a portion of the grinding machine depicted in FIG. 1, the grinding machine being shown in combination with a workpiece and a portion of the workpiece stock.

As best illustrated in FIG. 2, the present invention also includes piezoelectric actuators 12 and 12' which act on bearings 6 and 7. As shown in FIG. 1, piezoelectric actuator 12 imparts motion to bearing 6 due to a change in the dimensions of an electrical potential applied thereto by a conventional electrical potential source 13. Preferably, the electrical potential applied to piezoelectric actuator 12 by the device 13 is strengthened by the use of a performance amplifier 14 as shown in FIG. 1. Also, as shown in FIG. 1, bearing 6 is preferably supported opposite to piezoelectric actuators 12 by a bearing support means which includes fixed bearing support 10 and a resilient bearing support member 11. Bearing support member 11 is preferably a conventional compression spring. However, those of ordinary skill will appreciate that member 11 can take the form of any one of the widely known and used resilient biasing means. Thus, outer bearing 9 of bearing 6 is supported on grinding shaft stock 2 at three points (e.g., at one point by fixed bearing support 10, at one point by resilient bearing support member 11 and at the final point by piezoelectric actuator 12. By selecting resilient support member 11 to have a sufficiently high spring force, it can be ensured that the movement of grinding shaft 3 can be precisely controlled under the influence of piezoelectric actuators 12 and 12'. Thus, other undesirable shifts, such as those due to vibrations, can be limited to negligible amounts.

The orientation of first and second bearings 6 and 7, and hence grinding shaft 3, is accomplished by applying an electrical potential to the piezoelectric actuators whereby piezoelectric elements thereof change shape and impart motion to bearings 6 and 7. The present invention, thus, utilizes a reversal of the so-called piezoelectric effect. In accordance with the piezoelectric effect, by application of an electrical field to a body, an elastic of the external dimensions of such body (either the lengthening or a shortening) occurs. Such deformations result from the electrical polarization of a dielectric material due to the electrostatic interaction between positive and negative poles of the dipoles which comprise the dielectric. Accordingly, as the electric potential is increased, a greater number of the dipoles face and approach one another causing a decrease in the overall dimensions of the body. Conversely, as the electrical potential applied to the body is decreased, a greater portion of the electrical dipoles which form the dielectric move apart from one another causing a corresponding increase in the overall dimensions of the body. Those of ordinary skill will readily appreciate that the change in overall volume of the body is directly proportional to the square of the electric field strength applied thereto. Also, as is widely known, the piezoelectric effect can be used to generate body deformations on the order of tens of μm and such deformations can occur even if opposed by forces of over ten kN. Thus, by using a piezoelectric actuator, the present invention is capable of effectuating very precise shifts of the grinding shaft over very short distances by applying an appropriate electrical potential to the piezoelectric actuator. Further, the piezoelectric actuator used with the present invention can effectuate such precise shifts in the orientation of the grinding shaft even when opposed by very high forces. In particular, positional shifts of the grinding shaft of up +/−40 μm can be achieved even when such shifts are opposed by the typical applicable forces of approximately 15 kN.

Piezoelectric actuators 12 and 12' can be operated to coact with bearings 6 and 7 in a variety of ways. For example, actuators 12 and 12' can be arranged to contact bearings 6 and 7 such that, actuators 12 and 12' do not pre-bias bearings 6 and 7 into an initial position. If such an arrangement is utilized, the application of an electrical potential to actuators 12 and 12' will cause movement (i.e., reorientation) of grinding shaft 3 relative to workpiece 5 in one direction only. In the preferred embodiment, however, actuator 12 and 12' are pre-biased toward bearings 6 and 7 due to the application of a pre-biasing electrical potential applied thereto. The ordinary artisan will readily appreciate from FIG. 1 that this arrangement is achieved by pre-biasing actuators 12 and 12' against bearings 6 and 7 along an axis x' such that resilient bearing support member 11 experiences some degree of compression. If this arrangement is utilized, the positioning of grinding shaft 3 in both forward and backward directions along axis x' can be achieved by increasing and decreasing the electrical potential. Since movement of grinding shaft 3 occurs during a change in the electrical potential applied to actuators 12 and 12', a given position of grinding shaft 3 can be maintained by holding the electrical potential constant after the desired position has been achieved.

A grinding machine in accordance with the preferred embodiment of the present invention can also include a measurement system 15 for detecting the dimensions of workpiece 5 at selected locations thereof. Measurement system 15 includes first and second pairs of measurement sensors (17, 17')and (18, 18'). Measurement system 15 generates measurement signals which are related to the dimensions detected by the first and second measurement sensors (17, 17') and (18, 18'). These signals are then passed through measurement signal amplifier 16 and fed into the electrical potential source 13. In this manner, electrical potential source 13 can generate electrical potentials which are related to the dimensions of workpiece 5.

During grinding operations, first and second pairs of measurement sensors (17, 17') and (18, 18') operate to constantly check the dimensions of workpiece 5 as grinding disk 4 is applied thereto. If the dimensions detected by first pair of measurement sensors (17, 17') differs from those detected by second pair of measurement sensors (18, 18'), measurement system 15 will produce a measurement signal which indicates that the grinding shaft axis is misaligned with the workpiece axis. Restated, measurement system 15 will produce a measurement signal indicating that the magnitude of oblique angle α is greater than zero. In response to the measurement signal, the electrical potential source 13 applies compensating electrical potentials to piezoelectric actuators 12 and 12'. This, in turn, will reposition bearings 6 and 7 to thereby reduce the magnitude of oblique angle α to zero. Thus, the magnitude of the electrical potential may be automatically varied to compensate for the presence of an oblique angle α until the grinding shaft axis is parallel with the workpiece axis.

While a preferred embodiment of the present invention has been described, various modifications and substitutions may be made to the grinding machine in accordance with the present invention without departing from the spirit and scope of the invention. Accordingly, it is to be understood that the present invention has been described by way of illustration and not limitation.

What is claimed is:

1. A grinding apparatus for grinding a workpiece mounted on a workpiece stock, the workpiece defining a fixed longitudinally extending axis, said apparatus comprising:

grinding shaft stock means;

a grinding shaft, said grinding shaft defining a longitudinally extending shaft axis;

bearing means movably disposed on said stock means for rotatably supporting said grinding shaft for rotation about said shaft axis, said bearing means supporting said shaft relative to the workpiece such that said shaft axis is at least generally coplanar with the workpiece axis;

adjustment means for adjusting the orientation of said shaft relative to the workpiece, said adjustment means being movably disposed between at least a portion of said bearing means and said stock means and acting on said bearing means to move said shaft relative to said workpiece when a changing electrical potential is applied thereto, said adjustment means comprising at least a first piezoelectric actuator; and means for selectively applying at least one electrical potential to said adjustment means whereby changes in said electrical potential induce movement of said piezoelectric actuator within the plane defined by said shaft axis and the workpiece axis.

2. An apparatus as recited in claim 1, wherein said bearing means comprises first and second bearings, said first and second bearings being disposed about said shaft axis and longitudinally spaced from one another, wherein said adjustment means further comprises first and second resilient bearing support means and a second piezoelectric actuator, and wherein each of said first and second bearings is supported between one of said first and second piezoelectric actuators and one of said first and second bearing support means.

3. An apparatus as recited in claim 2, wherein each of said first and second bearing support means comprises a fixed bearing support member and a spring.

4. An apparatus as recited in claim 2, wherein said means for applying at least one electrical potential applies at least a pre-biasing electrical potential to said adjustment means to thereby pre-bias said first and second actuators against said first and second bearings, respectively.

5. An apparatus as recited in claim 3, wherein said means for applying at least one electrical potential applies at least a pre-biasing electrical potential to said adjustment means to thereby pre-bias said first and second piezoelectric actuators against said first and second bearings, respectively.

6. An apparatus as recited in claim 2, wherein said bearing means further comprises first and second outer bearing rings, each of said first and second bearing rings being disposed between one of said first and second bearings, one of said first and second piezoelectric actuators and one of said first and second support means.

7. An apparatus as recited in claim 3, wherein said bearing means further comprises first and second outer bearing rings, each of said first and second bearing rings being disposed between one of said first and second bearings, one of said first and second piezoelectric actuators and one of said first and second support means.

8. An apparatus as recited in claim 4, wherein said bearing means further comprises first and second outer bearing rings, each of said first and second bearing rings being disposed between one of said first and second bearings, one of said first and second piezoelectric actuators and one of said first and second support means.

9. An apparatus as recited in claim 1, wherein said bearing means comprises at least one bearing, wherein said adjustment means further comprises resilient bearing support means disposed between said stock means and said one bearing, and wherein said piezoelectric actuator is disposed between said stock means and said one bearing, said piezoelectric actuator coacting with said support means to position said one bearing.

10. An apparatus as recited in claim 1, wherein said bearing means comprises one bearing, wherein said adjustment means further comprises spring and a fixed bearing support member disposed between said stock means and said bearing, and wherein said piezoelectric actuator coacts with said spring and said fixed bearing support member to position said bearing.

11. An apparatus as recited in claim 1, wherein said apparatus further comprises measurement means for measuring the physical dimensions of selected portions of the workpiece, wherein said measurement means produces a measurement signal which is related to the dimensions of the measured portions of the workpiece, and wherein said electrical potential applied to said means for applying at least one electrical potential is related to said measurement signal.

12. An apparatus as recited in claim 2, wherein said apparatus further comprises measurement means for measuring the physical dimensions of selected portions of the workpiece, wherein said measurement means produces a measurement signal which is related to the dimensions of the measured portions of the workpiece, and wherein said electrical potential applied by said means for applying at least one electrical potential is related to said measurement signal.

13. An apparatus as recited in claim 4, wherein said apparatus further comprises measurement means for measuring the physical dimensions of selected portions of the workpiece, wherein said measurement means produces a measurement signal which is related to the dimensions of the measured portions of the workpiece, and wherein said electrical potential applied by said means for applying at least one electrical potential is related to said measurement signal.

14. An apparatus as recited in claim 9, wherein said apparatus further comprises measurement means for measuring the physical dimensions of selected portions of the workpiece, wherein said measurement means produces a measurement signal which is related to the dimensions of the measured portions of the workpiece, and wherein said electrical potential applied by said means for applying at least one electrical potential is related to said measurement signal.

15. An apparatus as recited in claim 11, wherein the workpiece has at least two cylindrical regions which are oriented coaxially with the workpiece axis, wherein each of the cylindrical regions have a diameter, wherein said measurement means comprises at least two measurement sensors for independently measuring the diameters of the cylindrical regions of the workpiece, wherein said measurement means produces at least two measurement signals which are related to the diameters of the cylindrical regions of the workpiece, and wherein said means for applying at least one electrical potential applies at least two electrical potentials to said adjustment means, each of said electrical potentials being related to one of said measurement signals.

16. An apparatus as recited in claim 12, wherein the workpiece has at least two cylindrical regions which are oriented coaxially with the workpiece axis, wherein each of the cylindrical regions have a diameter, wherein said measurement means comprises at least two measurement sensors for independently measuring the diameters of the cylindrical regions of the workpiece, wherein said measurement means produces at least two measurement signals which are related to the diameters of the cylindrical regions of the workpiece, and wherein said means for applying at least one electrical potential applies at least two electrical potentials to said adjustment means, each of said electrical potentials being related to one of said measurement signals.

17. An apparatus as recited in claim 13, wherein the workpiece has at least two cylindrical regions which are oriented coaxially with the workpiece axis, wherein each of the cylindrical regions have a diameter, wherein said measurement means comprises at least two measurement sensors for independently measuring the diameters of the cylindrical regions of the workpiece, wherein said measurement means produces at least two measurement signals which are related to the diameters of the cylindrical regions of the workpiece, and wherein said means for applying at least one electrical potential applies at least two electrical potentials to said adjustment means, each of said electrical potentials being related to one of said measurement signals.

18. An apparatus as recited in claim 14, wherein the workpiece has at least two cylindrical regions which are oriented coaxially with the workpiece axis, wherein each of the cylindrical regions have a diameter, wherein said measurement means comprises at least two measurement sensors for independently measuring the diameters of the cylindrical regions of the workpiece, wherein said measurement means produces at least two measurement signals which are related to the diameters of the cylindrical regions of the workpiece, and wherein said means for applying at least one electrical potential applies at least two electrical potentials to said adjustment means, each of said electrical potentials being related to one of said measurement signals.

19. An apparatus as recited in claim 1, wherein said adjustment means further comprises resilient bearing support means, and wherein said bearing means is, at least in part, supported between said piezoelectric actuator and said bearing support means.

20. An apparatus as recited in claim 19, wherein said bearing means includes at least one bearing and wherein said means for applying at least one electrical potential applies at least a pre-biasing electrical potential to said adjustment means to thereby pre-bias said one bearing between said piezoelectric actuator and said bearing support means.

* * * * *